3,334,130
SUBSTITUTED CARBANILATE HERBICIDES
Ralph P. Neighbors, Olathe, Kans., assignor, by mesne assignments, to Gulf Oil Corporation, Pittsburgh, Pa., a corporation of Pennsylvania
No Drawing. Filed Oct. 2, 1963, Ser. No. 313,176
5 Claims. (Cl. 260—471)

This invention relates to novel compositions that possess utility as herbicides and more particularly to new herbicides which are useful in selective control of plant growth. In the past there have been a few carbanilate esters employed as herbicides. For example, the isopropyl ester of carbanilic acid has been used to inhibit germination of potatoes and as a somewhat inefficient herbicide in certain compositions. It has now been discovered that cyclopropyl carbanilates containing certain substituent groups are especially effective as selective herbicides.

According to this invention, there are provided selective herbicidal compositions comprising as the active ingredient at least one substituted cyclopropyl carbanilate of the general formula

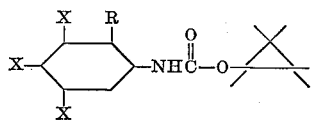

in which R is selected from the group consisting of hydrogen and methyl and X is selected from the group consisting of hydrogen and chlorine, with the added provision that at least one X is chlorine. Further provided is a method of controlling plant growth employing these compositions.

The cyclopropyl carbanilates of this invention may be prepared conveniently by the general method of Magrane and Cottle, Journal of American Chemical Society, volume 64, page 484 (1942) and volume 65, pages 1782-3 (1942–1943). According to this method cyclopropanol is first synthesized and then reacted with a corresponding substituted phenyl isocyanate to produce the carbanilate ester. The following example illustrates the method of synthesis which is applicable to the entire group of cyclopropyl carbanilates employed as herbicides in compositions of this invention.

EXAMPLE

In a stirred reactor was placed 18.8 parts by weight of 3,4-dichlorophenyl isocyanate and approximately 105 parts by weight of benzene. The mixture was heated to just below the boiling point and 7.7 parts by weight of cyclopropanol was added. The mole ratio of cyclopropanol to substituted phenyl isocyanate was 1.32. Immediately following the addition of cyclopropanol the evolution of heat was noted and a solid began to precipitate. Following the initial evolution of heat, the reaction mixture was maintained at reflux temperature for 15 minutes. The mixture was then allowed to cool to room temperature and stand for about 30 hours.

The following compounds exemplify the cyclopropyl carbanilates of this invention and were prepared by the above procedure.

*Cyclopropyl 3,4-dichlorocarbanilate*

White crystalline solid obtained 92.2% yield; M.P. 91–92.5°.
*Analysis.*—Calc'd. for $C_{10}H_9Cl_2NO_2$: C, 48.81; H, 3.68; N, 5.69; Cl, 28.82. Found: C, 48.99; H, 3.96; N, 5.65; Cl, 28.75.

*Cyclopropyl 3-chlorocarbanilate*

White crystalline solid obtained in 96.4% yield, M.P. 63.5–64.5°.
*Analysis.*—Calc'd. for $C_{10}H_{10}ClNO_2$: C, 56.75; H, 4.76; N, 6.62; Cl, 16.75. Found: C, 56.74; H, 4.50; N, 6.41; Cl, 16.64.

*Cyclopropyl 4-chlorocarbanilate*

White crystalline solid obtained in 81.9% yield; M.P. 121–122°.
*Analysis.*—Calc'd. for $C_{10}H_{10}ClNO_2$: C, 56.75; H, 4.76; N, 6.62; Cl, 16.75. Found: C, 56.68; H, 4.87; N, 6.59; Cl, 16.59.

*Cyclopropyl 5-chloro-2-methylcarbanilate*

White crystalline solid obtained in 86.2% yield; M.P. 105–106°.
*Analysis.*—Calc'd. for $C_{11}H_{12}Cl_2NO_2$: C, 58.54; H, 5.36; N, 6.20; Cl, 15.71. Found: C, 58.46; H, 5.52; N, 6.27; Cl, 15.67.

The substituted cyclopropyl carbanilate herbicides of this invention possess biological activity of a high level, so that an inert carrier is required to obtain uniform distribution. They may be applied as a pre-emergent or post-emergent treatment. In pre-emergent treatment the herbicide is applied in combination with an inert carrier, preferably in the form of a spray or a granular solid at the time of planting. In addition, a pre-emergent treatment may be repeated after the crop is standing to prevent emergence of weeds, preferably being applied in the form of a granular solid formulation to reduce the effect on crop plant foliage. In post-emergent treatment the herbicide is applied to the growing plant, preferably in the form of an aqueous dispersion, made with the use of water as principal inert carrier, along with such auxiliary agents as solvents and surface active agents such as emulsifiers, dispersants or penetrants. The following formulation is representative of the water-dispersible type suitable for spray application: Active ingredient 10%, solvent (approximately 50% xylene, 50% kerosene), 35% and emulsifier, (for example Emulphor EL–719, a polyoxyethylated vegetable oil), 55%. About 4 to 5 parts of this emulsifiable concentrate may be mixed with about 35 parts of water to produce an aqueous dispersion for spray application.

The herbicides of this invention may also be prepared in the form of wettable powders employing dry, inert material such as kaolin to prevent caking and may be compounded with clays, powdered chalk and other suitable solids as inert carriers and pelletized to yield granular solid formulations. In preparation of formulations of this type it is preferred to use a solvent so as to obtain thorough, even distribution on the inert solid and to add a surface active agent to improve the contact and/or penetration of the active ingredient into the plants.

The specific herbicidal compounds prepared and disclosed herein were employed in preparation of water-dispersible formulations of the type disclosed above and were tested on plants from 10 to 18 days after emergence at an application rate of 5 lbs. of active ingredient per acre and a spray volume of 60 gallons per acre. Seven days after treatment the plants were observed. The results are shown in the table.

The pre-emergence effectiveness of the herbicidal compounds of Examples 1 to 4 was tested by dissolving approximately three parts of active ingredient in 2,000 parts of acetone as inert carrier and spraying seeded flats with the solution at the application rate of 10 lbs. per acre. (The soil itself, in this instance, acted as an inert solid diluent.) After 21 days at 75–85° F. day temperature, the treated flats were examined. The results are also shown in the table. The results of both tests are rated as follows:

C=Chlorosis
N=Necrosis
G=Growth inhibition
K=Non-emergence
F=Formative effect
—=No experimental data
0=No effect
1=Slight effect
2=Moderate effect
3=Severe effect
4=Maximum effect or dead plants

TABLE.—HERBICIDAL TEST DATA

|  | Cyclopropyl 3,4-dichlorocarbanilate | | Cyclopropyl 3-chlorocarbanilate | | Cyclopropyl 4-chlorocarbanilate | | Cyclopropyl 2-methyl-5-chlorocarbanilate | |
|---|---|---|---|---|---|---|---|---|
|  | Pre-Emerg. | Post-Emerg. | Pre-Emerg. | Post-Emerg. | Pre-Emerg. | Post-Emerg. | Pre-Emerg. | Post-Emerg. |
| Alfalfa | N4 | N4 | N4 | N4 | N1 | N4 | N2 | 0 |
| Brome | 0 | — | N4 | — | N1 | — | 0 | — |
| Flax | 0 | N4 | N4 | N1 | N1 | N4 | 0 | 0 |
| Oats | 0 | N4 | N4 | N1 | N1 | N1 | 0 | 0 |
| Radish | 0 | N4 | 0 | N4 | N1 | N1 | 0 | — |
| Sugar Beets | N4 | N4 | 0 | N4 | 0 | N4 | N2 | 0 |
| Corn | 0 | N4 | N4 | 0 | 0 | 0 | 0 | 0 |
| Coxcomb | N4 | — | N4 | — | N1 | — | N3 | — |
| Cotton | 0 | — | G2 | — | N1 | — | 0 | — |
| Crabgrass | N4 | — | N4 | — | N4 | — | N3 | — |
| Millet | N4 | N4 | N4 | N3 | N4 | N4 | N4 | 0 |
| Soybeans | 0 | 0 | G2 | 0 | N4 | 0 | 0 | 0 |
| Tomato | — | N1 | — | N1 | — | 0 | — | 0 |
| Wheat | — | N4 | — | 0 | — | N3 | — | 0 |

From the test results it can be seen that the compositions of this invention are useful for both post-emergence treatment of certain crops and also pre-emergence application to control growth of weeds. For example, cyclopropyl 5-chloro-2-methylcarbanilate is useful for pre-emergence control of weeds in such crops as brome, flax, oats, cotton and soybeans and cyclopropyl 3-chlorocarbanilate is useful for post-emergence control of weeds in such crops as corn, soybeans and wheat. Various special applications of these compositions, taken along and in combination, will be apparent to those who are skilled in the art.

What is claimed is:
1. Substituted cyclopropyl carbanilates of the general formula

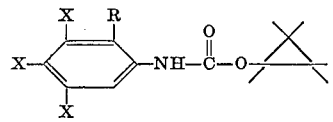

in which R is selected from the group consisting of hydrogen and methyl and X is selected from the group consisting of hydrogen and chlorine, with the added provision that at least one X is chlorine.
2. Cyclopropyl 3,4-dichlorocarbanilate.
3. Cyclopropyl 3-chlorocarbanilate.
4. Cyclopropyl 4-chlorocarbanilate.
5. Cyclopropyl 5-chloro-2-methylcarbanilate.

References Cited
UNITED STATES PATENTS

| 2,744,819 | 5/1956 | Toorman | 71—2.6 |
| 3,083,226 | 3/1963 | Horrom et al. | 260—471 |
| 3,097,229 | 7/1963 | Beaver et al. | 260—471 |
| 3,211,544 | 10/1965 | Dubrovin | 71—2.6 |

LORRAINE A. WEINBERGER, *Primary Examiner.*

JAMES O. THOMAS, JR., R. K. JACKSON, *Examiners.*

L. A. THAXTON, *Assistant Examiner.*